(12) United States Patent
Gallo

(10) Patent No.: US 9,508,380 B2
(45) Date of Patent: Nov. 29, 2016

(54) ENCLOSURE FOR READING AN OPTICAL MEDIUM AT AN INPUT PORT

(71) Applicant: Nikolai Gallo, Atherton, CA (US)

(72) Inventor: Nikolai Gallo, Atherton, CA (US)

(73) Assignee: SONY CORPORATION OF AMERICA, New York, NY (US)

( * ) Notice: Subject to any disclaimer, the term of this patent is extended or adjusted under 35 U.S.C. 154(b) by 0 days.

(21) Appl. No.: 14/527,558

(22) Filed: Oct. 29, 2014

(65) Prior Publication Data

US 2015/0154998 A1    Jun. 4, 2015

Related U.S. Application Data

(60) Provisional application No. 61/897,090, filed on Oct. 29, 2013.

(51) Int. Cl.
| | | |
|---|---|---|
| *G11B 7/005* | (2006.01) | |
| *G11B 17/04* | (2006.01) | |
| *G11B 7/127* | (2012.01) | |
| *G11B 7/131* | (2012.01) | |
| *G06K 7/10* | (2006.01) | |
| *G11B 7/14* | (2012.01) | |

(52) U.S. Cl.
CPC ....... *G11B 17/0401* (2013.01); *G06K 7/10722* (2013.01); *G11B 7/127* (2013.01); *G11B 7/131* (2013.01); *G11B 7/14* (2013.01)

(58) Field of Classification Search
CPC . G11B 2220/232; G11B 7/002; G11B 7/005; G11B 7/127; G11B 7/13; G11B 7/131; G11B 17/0401; G06K 7/0004; G06K 7/0021; G06K 7/10574; G06K 7/10722; G06K 7/10732; G06K 7/10782
USPC ................. 369/44.37, 44.41, 124.03, 275.3; 235/440, 454, 456
See application file for complete search history.

(56) References Cited

U.S. PATENT DOCUMENTS

| | | | | |
|---|---|---|---|---|
| 3,721,807 A * | 3/1973 | Miller | ................ | G06K 17/0032 235/454 |
| 5,379,266 A * | 1/1995 | Russell | .................. | G11C 7/005 365/125 |
| 5,436,871 A * | 7/1995 | Russell | .................. | G11C 7/005 365/234 |
| 5,563,859 A * | 10/1996 | Masuda | ............... | G11B 7/0037 369/53.34 |
| 5,638,355 A * | 6/1997 | Jabr | ........................ | G11B 7/005 369/275.1 |
| 6,078,468 A * | 6/2000 | Fiske | ................... | G11B 5/4886 360/255.2 |
| 6,141,312 A | 10/2000 | Masters et al. | | |
| 6,603,714 B1 * | 8/2003 | Winter | .................... | G11B 7/007 369/30.15 |
| 7,444,069 B1 * | 10/2008 | Bernsley | ................ | G11B 27/10 386/239 |
| 8,190,001 B2 * | 5/2012 | Bernsley | .............. | G11B 27/105 386/337 |
| 8,406,102 B1 * | 3/2013 | Saitoh | ................ | G11B 7/00458 369/110.01 |
| 2002/0093903 A1 * | 7/2002 | Hasegawa | .......... | G11B 7/08564 369/118 |

(Continued)

OTHER PUBLICATIONS

International Search Report issued by the International Searching Authority for related PCT/US2014/062967, mailed on Feb. 18, 2015.

*Primary Examiner* — Thomas Alunkal
(74) *Attorney, Agent, or Firm* — Trellis IP Law Group, PC

(57) ABSTRACT

Various devices and systems may benefit from enhanced reading of optical media. For example, certain computer systems may benefit from array reading of optical media. An apparatus may include, for example, an array of optical sensors. The array of optical sensors may be configured to read a plurality of parallel linear strips of data from an optical medium.

13 Claims, 6 Drawing Sheets

(56) References Cited

U.S. PATENT DOCUMENTS

| | | | | |
|---|---|---|---|---|
| 2003/0012107 A1* | 1/2003 | Fukui | ............... | G11B 7/268 369/53.25 |
| 2005/0108741 A1* | 5/2005 | Cookson | ............... | G11B 7/08594 720/659 |
| 2009/0245067 A1* | 10/2009 | Saito | ............... | G11B 31/006 369/100 |
| 2010/0073742 A1* | 3/2010 | Tan | ............... | H04N 1/00533 358/498 |
| 2011/0253916 A1* | 10/2011 | Murosaki | ............... | B65H 7/04 250/559.07 |

* cited by examiner

ENCLOSURE FOR READING AN OPTICAL MEDIUM AT AN INPUT PORT

CROSS-REFERENCE TO RELATED APPLICATION

This application is related to, and claims the benefit and priority of U.S. Provisional Patent Application No. 61/897,090 filed Oct. 29, 2013, the entirety of which is hereby incorporated herein by reference.

BACKGROUND

Field

Various devices and systems may benefit from enhanced reading of optical media. For example, certain computer systems may benefit from array reading of optical media.

Description of the Related Art

Traditionally, optical media such as laser disc, compact disc (CD), CD read only memory (CD-ROM), and digital versatile disc (DVD), among others, store data in spiral shaped strips of pits, sometimes called tracks, in a disc. The disc is then rotated at high speed while the tracks are read by an optical sensor, referred to as an optical pickup.

Track pitch can refer to the distance between two tracks, measured from the center of one track to the center of the next track. Typical track pitches can range from 1.5 to 1.7 microns, in the case of CD-ROMs. By contrast, the track pitch for DVDs is typically around 740 nanometers.

The pits can be presented in a single layer, as is typically done for CD-ROMs. By contrast, the pits can also be provided in more than one layer, as is popular in the case of DVDs.

SUMMARY

According to certain embodiments, an apparatus can include an enclosure and an input port in a first face of the enclosure. The input port can be configured to receive a computer-readable storage medium. The input port can be configured to define a chamber having an upper side and a lower side. The apparatus can also include an array of sensors configured to read the computer-readable medium, wherein the array of sensors is arranged in at least one of the upper side or the lower side, wherein the array of sensors is configured to read the computer-readable storage medium while the computer-readable storage medium is at least one of entering or exiting the chamber.

In certain embodiments, a method can includes scanning an optical medium in a drive. The scanning can include scanning a plurality of parallel linear or U-shaped tracks of data in parallel.

BRIEF DESCRIPTION OF THE DRAWINGS

For proper understanding of the invention, reference should be made to the accompanying drawings, wherein.

DETAILED DESCRIPTION

Various embodiments may provide for devices, systems, and methods for an optical reader and optical reading. The various embodiments discussed and illustrated herein are merely examples, and should not be taken to be limiting.

Figure 1:
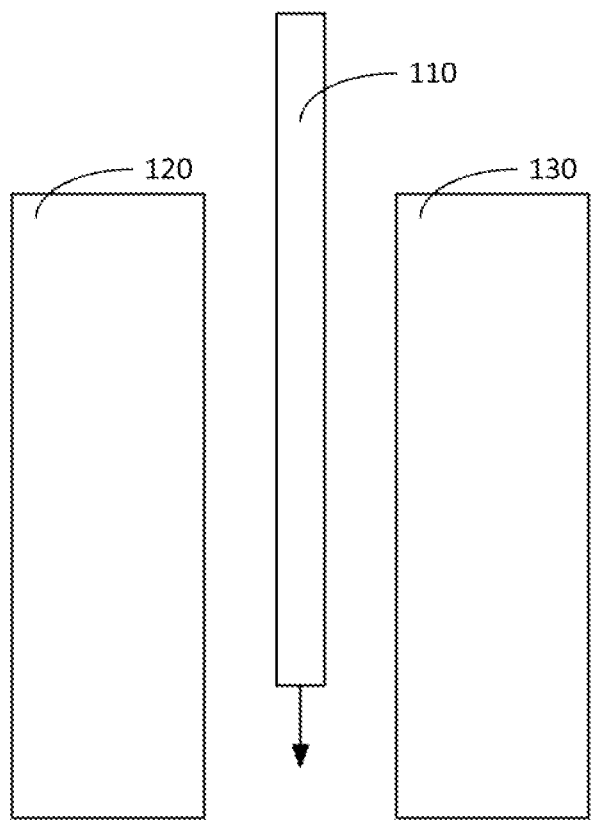
FIG. 1 illustrates an optical reader according to certain embodiments.

FIG. 1 illustrates an optical reader according to certain embodiments. As shown in FIG. 1, which may be a cross-sectional view, an optical reader can include a first side 120 and a second side 130. The first side 120 and second side 130 can be spaced apart to permit an optical medium 110 to pass between the sides. In certain embodiments, the optical medium 110 is one-sided, meaning that data is stored on only one side, such as the left side as shown in FIG. 1. In this case, one side, for example, first side 120 may be provided with one or more optical sensors. In other embodiments, the optical medium 120 may be two-sided, meaning that data is stored on both sides. In such a case, both the first side 120 and the second side 130 may be provided with one or more optical sensors.

The first side 120 and the second side 130 are shown completely separated from one another in a particular cross-section. However, the two sides can be connected to each other in various ways. For example, the two sides can be connected to form a C-shaped cross-section through which the optical medium 110 can pass. The two-sides can also be connected to form a rectangular tube shape, through which the optical medium 110 can pass. Additionally, one or both ends of the tube or c-shape can be closed. The closed side(s) can include a door or other portal that is configured to permit an optical medium 110 to enter and leave the device.

Figure 2:
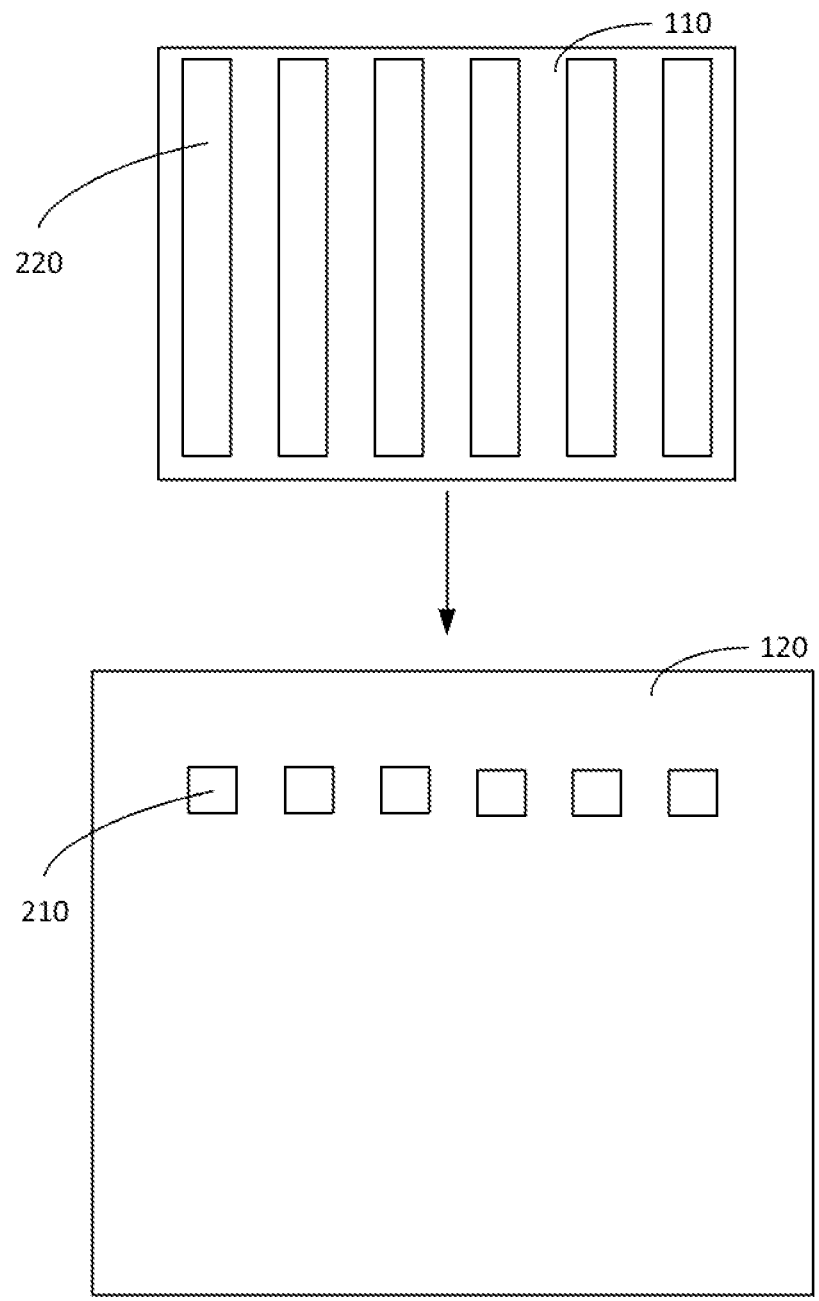
FIG. 2 illustrates another optical reader according to certain embodiments.

FIG. 2 illustrates another optical reader according to certain embodiments. FIG. 2 illustrates a cross-section of an optical reader that may be roughly orthogonal to the cross-section shown in FIG. 1. As shown in FIG. 2, an optical medium 110 may pass over a first side 120 of an optical reader. The first side may be provided with an array 210 of optical sensors or optical pickups.

The optical medium 110 may have an array 220 of a plurality of data strips. As illustrated, these strips may be linear, although other shapes are permitted. The array 220 of strips may correspond in number to the array 210 of optical sensors. The strips are shown as widely separated, but they may be closely packed together. Each strip may include one or several columns of pits or other carriers of optical data.

Figure 3:
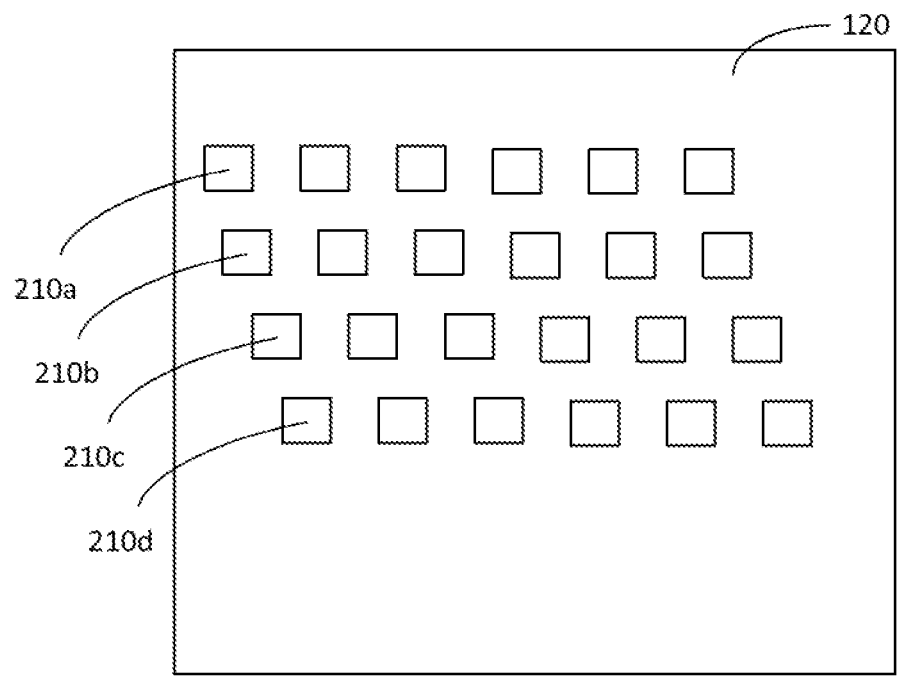
FIG. 3 illustrates an optical reader array according to certain embodiments.

FIG. 3 illustrates an optical reader array according to certain embodiments. As shown in FIG. 3, there can be multiple arrays 210a, 210b, 210c, 210d of optical readers on the first side 120 of the optical reader. The arrays can be positioned as shown in cases where, for example, the size of the optical reader is bigger than the size of the corresponding strip. For example, if an optical reader is a centimeter wide and each strip is only one millimeter wide, adjacent strips may be read by optical sensors that are offset from one another in the direction of the strips. In such a case, there may be, for example, ten rows of arrays, with a total number of optical readers corresponding to the total number of strips.

It is also possible that each optical reader can correspond to and simultaneously read a plurality of adjacent strips. Thus, for example, each optical reader may be able to read a stripe made up of a plurality of parallel strips.

In certain cases the optical medium 110 may have more than one layer. In such cases, there may be more than one optical reader for each strip or stripe. Instead, there may be one optical reader for each strip at each layer. Thus, for example, if there are ten strips and two layers, there may be 20 optical readers.

As shown in FIGS. 1 through 3, the optical medium 110 may be rectangular in shape and can be provided with strips, stripes, tracks, or the like of data arranged as, for example, linear columns running in one direction of the medium. Although illustrated as wider than long, the optical medium 110 may alternatively be square or longer than wide. In certain embodiments, the optical medium 110 may be a long ribbon, rail, or belt.

The optical reader as illustrated can be configured to read the entire optical medium 110 in a single pass through or into and out of the device. In a case where the optical medium 110 moves in one direction into the device and in another direction out of the device, the optical reader can be configured to alter, during the change of direction, the reading of the array of optical sensors. The changes can include, for example, moving the array slightly to one side or the other, moving the medium slightly to one side or the other, changing a reading angle of the optical sensors, changing a focus of the optical sensors to a different layer, or the like. This may permit the array reader to read one strip or stripe as the optical medium is being inserted and another strip or stripe as the optical medium is being removed.

Other shapes of the optical medium 110 are also permitted. For example, the optical medium may have an asymmetrical shape to permit easy identification of its orientation. Moreover, the optical medium may have holes, notches, and/or vias to permit easier pick up and manipulation. The optical may also be other shapes. For example, the optical medium may be approximately in the shape of a regular hexagon or a regular triangle. The shape of the optical medium is not limiting, and any shape of optical medium may be used. Likewise, the shape of the strips and stripes may be varied, as desired, in various embodiments.

Other features can be added to the optical reader according to certain embodiments. For example, the optical reader can be provided with a tray for holding the optical medium 110. The tray can be configured to move the optical medium 110 between the first side 120 and the second side 130 at an appropriate speed. The tray can also be configured to precisely position the optical medium 110 with respect to the optical reader. Furthermore the tray can be configured to permit easy removal of the optical medium 110 from the optical reader by a person or robot.

Figure 4:
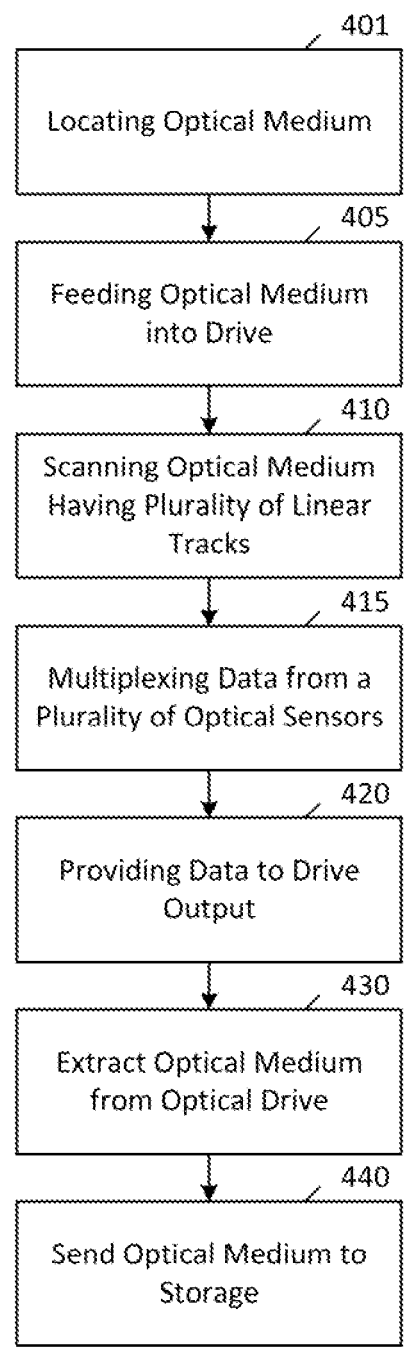
FIG. 4 illustrates a method according to certain embodiments.

FIG. 4 illustrates a method according to certain embodiments. As shown in FIG. 4, a method can include, at 410, scanning an optical medium in a drive. The scanning can comprise scanning a plurality of parallel linear tracks of data in parallel. Other shapes of the tracks, such as U-shaped tracks, are also permitted.

The method can further include, at 420, providing data from the optical medium to an output of the drive. The provision of data from the optical medium to the output of the drive can involve, as an optional prerequisite, multiplexing at 415, the data from a plurality of optical sensors.

The method can also optionally include, prior to scanning, at 405 feeding the optical medium into the drive. This feeding can be performed by, for example, a tray mechanism that cradles edges of the optical medium, or by other mechanisms, such as magnetic attraction, if the optical medium is provided with a ferromagnetic or other magnetizable element.

For example, magnets can be used to hold one end of the optical medium, and the optical medium can be inserted into and removed from a drawer-shaped opening by, for example, a robotic arm. Other mechanisms, such as one or more spindles configured to hold the optical medium, are also permitted.

The method may be performed by a particular machine, such as an optical drive. The optical drive can include, in addition to an array of optical sensors, a multiplexor configured to multiplex outputs from the array of optical sensors. Other processing hardware, such as one or more controller, are also permitted. Furthermore, additional data hardware, such as a bus, buffer memory, and long term memory are also permitted. The memory can take the form of any random access memory (RAM) or read-only memory (ROM). The system can also include a power supply, which can provide power to the sensors, processing hardware, and data hardware. The system can further include a case and supporting hardware, such as cabling, fans, and the like. Other hardware is also permitted.

The system can be part of a computing rack system. Alternatively, the system can be part of a standalone computing system. In certain cases, the system can be part of a data server. The data server may include multiple optical media, robots configured to identify the optical media at 401, place each optical medium in a drive to be read, and to return, at 440, the optical medium to storage after being read and extracted, at 430, from the optical drive.

The described steps can vary as to their order of operations and so on. For example, the scanning at 410 can take place during both the feeding at 405 and the extracting at 430, or only at one of those times, or only between those two times, or any combination of times, as desired.

The multiplexing the data from the plurality of optical sensors can involve storing the data in buffer memory and reassembling or reconstructing a file or track stored on the optical medium. The providing the data to a drive output can include providing the data over a serial or parallel interface between an optical drive and a computer system, such as a serial advanced technology attachment (SATA) or small computer system interface (SCSI) interface.

Figure 5:
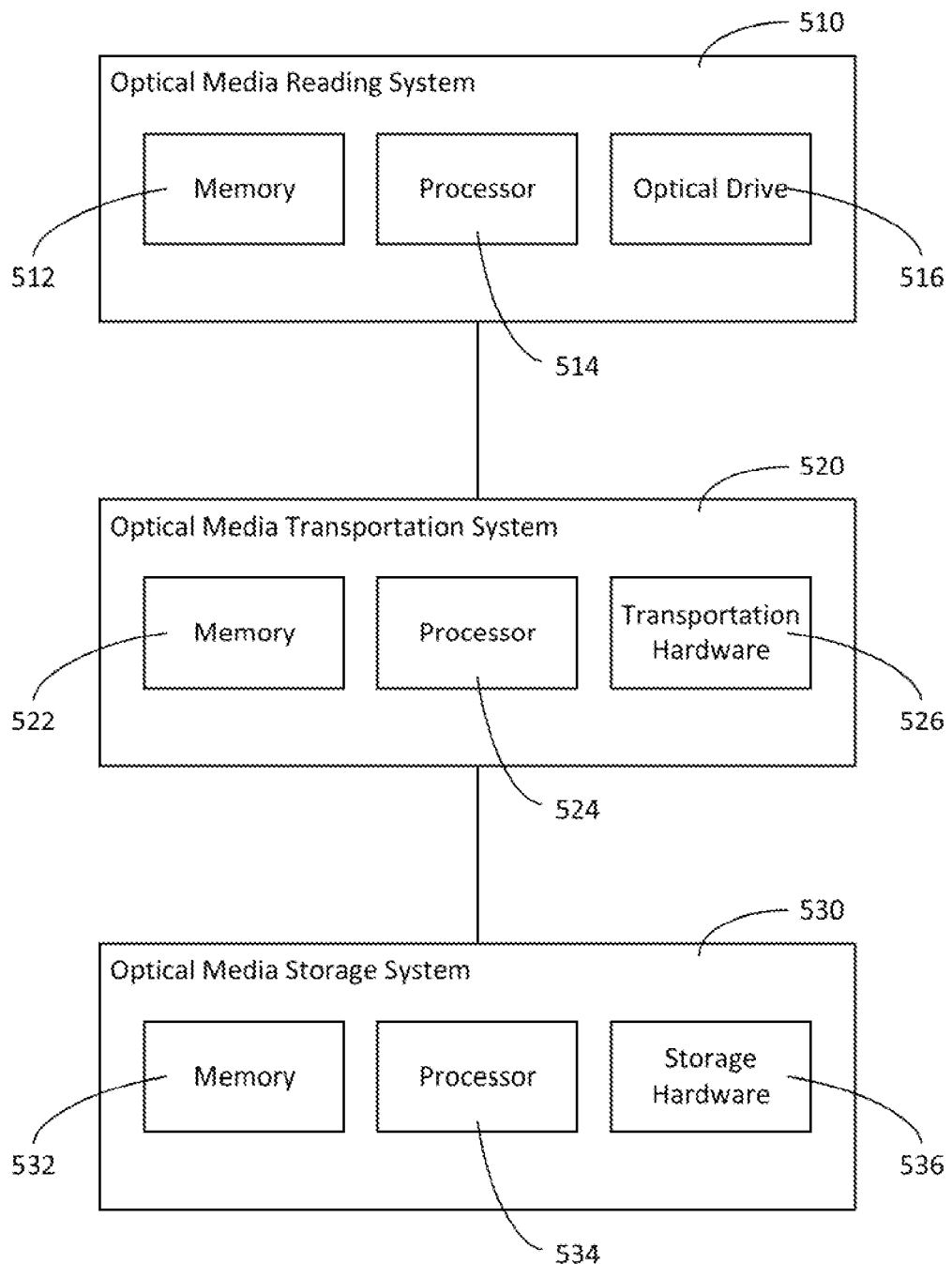
FIG. 5 illustrates a system according to certain embodiments.

FIG. 5 illustrates a system according to certain embodiments. As shown in FIG. 5, a system can include an optical media reading system 510, such as an optical drive or a computer that includes an optical drive. The system can also include an optical media storage system 530, which can be, for example, an optical archive. The system can further include an optical media transportation system 520, which can move an optical medium between the optical media storage system 530 and the optical media reading system 510.

Each of the systems can include a corresponding memory 512, 522, 532 and a corresponding processor 514, 524, 534. This memory and processor can be variously implemented in each case. For example, the processor and memory can be separate chips or the same chip. Moreover, the processor can include one or more controller, such as a central processing unit (CPU) or application specific integrated circuit (ASIC).

The optical media reading system 510 can include an optical drive 516. The optical drive 516 can include the kinds of features illustrated in FIGS. 1 through 3, discussed above. The optical drive 516 may be a one sided or two-sided drive.

The optical media transportation system 520 can include transportation hardware 526. This transportation hardware 526 may include a robotic arm on a chassis that moves along tracks between the optical media storage system 530 and the optical media reading system 510. Other implementations are also possible. For example the optical media transportation system 520 can be an android robot system configured to autonomously navigate between the optical media storage system 530 and the optical media reading system 510.

The optical media storage system 530 can include storage hardware 536. This storage hardware 536 can be configured to store optical media in, for example, a set of drawers. The storage hardware 536 can also include equipment such as near field radio frequency identifier (RFID) readers to permit the storage hardware 536 to maintain an accurate inventory of the optical media stored therein. Other implementations are also possible. For example, it is not necessary that the optical media storage system 530 include memory 532 or processor 534, and storage hardware 536 can be completely passive hardware that merely receives and keeps in place a collection of optical media.

Figure 6:
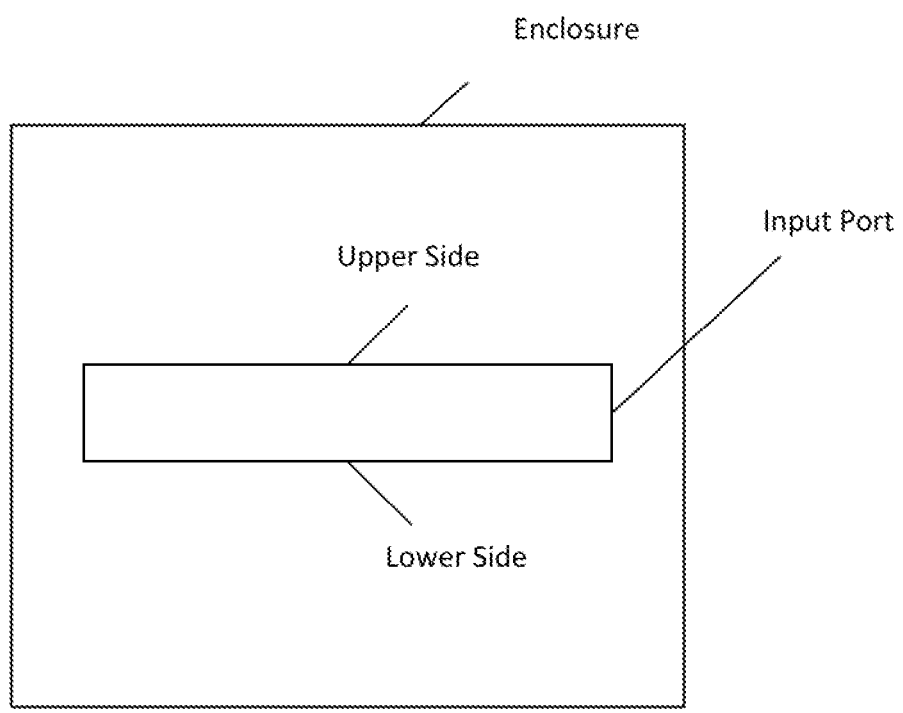
FIG. 6 illustrates an apparatus according to certain embodiments.

FIG. 6 illustrates an apparatus according to certain embodiments. As shown in FIG. 6, an apparatus can include an enclosure and an input port in a first face of the enclosure. The enclosure can be a complete or partial enclosure. For example, the enclosure can be structured is a box with one more input and/or output ports. The enclosure can be open on one or more sides. In certain embodiments, there can be a similar output port on an opposite face of the enclosure.

The input port can be configured to receive a computer-readable storage medium. For example, the input port can be configured to receive one of the rectangular media described above, although other shapes are permitted.

The input port can be configured to define a chamber having an upper side and a lower side. Other embodiments, may be configured to handle other shapes of media. For example, a medium shaped like a triangular prism may be used. In such a case, there may be a plurality of upper sides at an angle to one another and a lower side, or a plurality of lower sides at an angle to each other and an upper side. A medium shaped like a cylinder can also be used. In such a case, the upper side may have a half circular shape and the lower side may similarly have a half circular shape. Other shapes of media are also permitted.

The apparatus can also include an array of sensors (such as those shown in FIGS. 2 and/or 3) configured to read the computer-readable medium. The array of sensors can be arranged in at least one of the upper side or the lower side. The array of sensors can be configured to read the computer-readable storage medium while the computer-readable storage medium is at least one of entering or exiting the chamber.

The array of sensors can be provided on both the upper side and the lower side of the chamber. Thus, in certain embodiments, the apparatus can simultaneously read both sides of a double-sided medium.

In certain embodiments, the array of sensors can be configured to read the computer-readable storage medium during linear translation of the computer-readable storage medium. This linear translation can be a movement of the computer-readable storage medium into and/or through the input port or orthogonal to such a movement.

The array of sensors can be configured to read a plurality of linear tracks of the medium. Also, or alternatively, the array of sensors can be configured to read a plurality of u-shaped tracks of the medium.

The computer-readable storage medium can be an optical medium, although other media are also permitted.

The apparatus can also include a tray configured to support and move the computer-readable storage medium within the chamber. Various embodiments of the tray are discussed above. The tray can be configured to move the computer-readable storage medium relative to the sensor array.

The array of sensors can include a plurality of rows of sensors offset from one another. Also, or alternatively, the array of sensors can include a plurality of steerable laser pickups or at least one laser configured to split into a plurality of beams to read a plurality of tracks simultaneously.

The apparatus can also include a multiplexer configured to multiplex outputs of the array of sensors and supply a multiplexed stream to an output of the apparatus. Various multiplexing techniques can be employed. In certain embodiments, the outputs of the array of sensors can be encoded as a plurality of symbols and output as such.

The computer-readable storage medium can be an optical ribbon, among other kinds of media, as described above.

The apparatus can also include a shifting mechanism configured to offset the array relative to the computer-readable storage medium. The shifting mechanism may be the tray described above, or a set of tracks or the like within the chamber. The computer-readable storage medium can be configured to exit and enter the chamber in a first direction. The shifting mechanism can be configured to offset the array in a second direction approximately orthogonal to the first direction. Thus the array may read a first set of parallel tracks during entry into the chamber and a second set of parallel tracks during exit out of the chamber.

Various modifications can be made to the above embodiments. For example, although in certain embodiments the optical drive may include a plurality of individual laser pickups, in certain embodiments the optical drive may include one or more laser pickup configured to operate as a steerable laser or otherwise to pick up multiple tracks in parallel.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

I claim:

1. An apparatus, comprising:
an enclosure;
an input port in a first face of the enclosure, wherein the input port is configured to receive a computer-readable storage medium, wherein the input port is configured to define a chamber having an upper side and a lower side;
an array of sensors configured to read the computer-readable medium, wherein the array of sensors is arranged in at least one of the upper side or the lower side, wherein the array of sensors is configured to read the computer-readable storage medium while the computer-readable storage medium is at least one of entering or exiting the chamber.

2. The apparatus of claim 1, wherein the array of sensors is provided on both the upper side and the lower side of the chamber.

3. The apparatus of claim 1, wherein the array of sensors is configured to read the computer-readable storage medium during linear translation of the computer-readable storage medium.

4. The apparatus of claim 1, wherein the array of sensors is configured to read a plurality of linear tracks of the medium.

5. The apparatus of claim 1, wherein the array of sensors is configured to read a plurality of u-shaped tracks of the medium.

6. The apparatus of claim 1, wherein the computer-readable storage medium comprises an optical medium.

7. The apparatus of claim 1, further comprising:
a tray configured to support and move the computer-readable storage medium within the chamber.

8. The apparatus of claim 1, wherein the array of sensors comprises a plurality of rows of sensors offset from one another.

9. The apparatus of claim 1, wherein the array of sensors comprises a plurality of steerable laser pickups.

10. The apparatus of claim 1, further comprising:
a multiplexer configured to multiplex outputs of the array of sensors and supply a multiplexed stream to an output of the apparatus.

11. The apparatus of claim 1, wherein the computer-readable storage medium comprises an optical ribbon.

12. The apparatus of claim 1, further comprising:
a shifting mechanism configured to offset the array relative to the computer-readable storage medium, wherein the computer-readable storage medium is configured to exit and enter the chamber in a first direction and the shifting mechanism is configured to offset the array in a second direction approximately orthogonal to the first direction.

13. The apparatus of claim 1, further comprising:
an output port in a second face opposite the first face of the enclosure, wherein the output port is configured to receive a computer-readable storage medium.

* * * * *